C. KROLL.
METHOD OF DISTILLING PETROLEUM PRODUCTS.
APPLICATION FILED APR. 11, 1918.

1,373,251.

Patented Mar. 29, 1921.
3 SHEETS—SHEET 1.

WITNESSES

INVENTOR
Cornelius Kroll

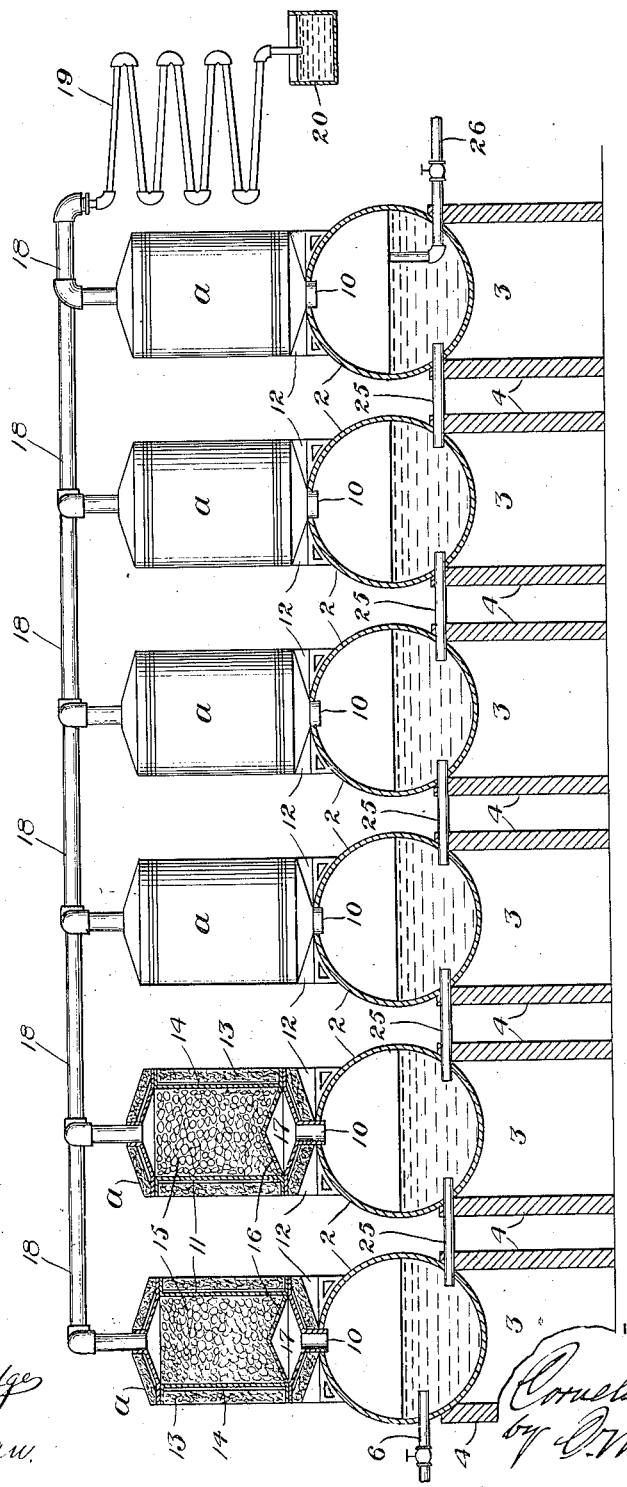

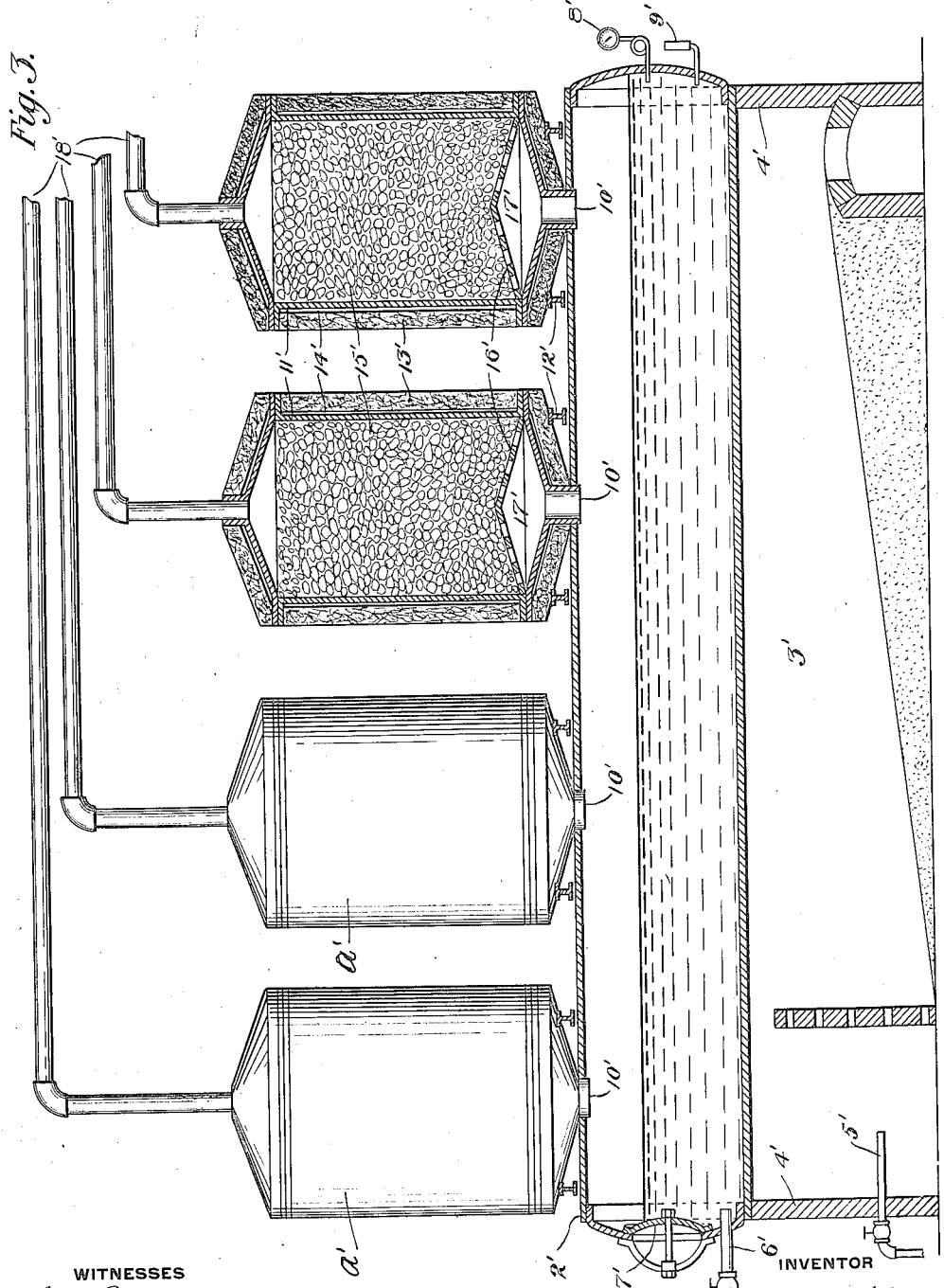

UNITED STATES PATENT OFFICE.

CORNELIUS KROLL, OF TULSA, OKLAHOMA.

METHOD OF DISTILLING PETROLEUM PRODUCTS.

1,373,251.

Specification of Letters Patent.

Patented Mar. 29, 1921.

Application filed April 11, 1918. Serial No. 227,967.

*To all whom it may concern:*

Be it known that I, CORNELIUS KROLL, a citizen of the United States, residing at Tulsa, in the county of Tulsa and State of Oklahoma, have invented certain new and useful Improvements in Methods of Distilling Petroleum Products, of which the following is a specification.

This invention relates to an improvement in the method of distilling petroleum products. It has in view to obtain condensed products with boiling points more comparable with the temperature at which they are distilled than is possible by the usual commonly practised atmospheric distillation of such products.

Efforts have been made to effect a separation of vapors more nearly in accordance with boiling points wherein the hot vapors, as they issue from the still, are conducted through a partial cooling device or mechanism for partially cooling the vapors, and thereby condensing the heavier fractional portions thereof, which are returned to the still for further distillation.

There are certain very serious disadvantages in such systems, of separation. Any system of distillation involving partial cooling, reëvaporation, further partial cooling, reëvaporation again, etc., is of necessity very inefficient from a heat standpoint, and expensive in fuel consumption because of the repeated necessary reheating of the condensates.

The capacity of the manufacturing unit is necessarily small because of the heat inefficiency, and the distillation can only proceed slowly because of the excessive heat losses or transfers. It is also impossible to devise a commercially successful apparatus that can uniformly partially cool every particle of vapor passing through it, some of the particles being cooled too much, and others not enough, resulting in a non-uniform product. Any system depending upon partial cooling is very difficult to control. Also the repeated distillation and reëvaporation, over and over again, necessarily deteriorates the quality of the product.

In my system I employ an improved method of separation of the vapors from the suspended particles, as contrasted to a partial condensation system.

In the practice of my invention, which is diametrically opposed to any such partial cooling process, I have in view to retain all of the heat in the vapors originally contained therein, and as imparted in the distillation stage. I thereby avoid the objections above noted, effecting the greatest efficiency and economy from a heat standpoint, securing a large capacity per unit on account of the possible rapid distillation, and producing an excellent resultant product.

I obtain the desired separation or elimination of such heavier particles by coalescence of the heavy particles back into their natural liquid state, as distinguished from a separation by condensation. Such separation by coalescence is obtained by bringing all of the particles of the entire mass of vapors into contact at a low velocity with the surface of an inclosed completely insulated mass of refractory material, such as broken stone or the like, which mass is uniformly maintained throughout the process at the same temperature as that of the vaporous mass, by such vaporous mass itself, or, in other words, the temperature of the vapors withdrawn from the mass of refractory material is substantially the same as that of the vapors entering the mass.

In my invention, I provide a collecting vessel of suitable cross sectional area and height, in combination with a still, and in open communication with the still, and designed to be maintained at normal atmospheric pressure.

The exposed surfaces of the collecting vessel are carefully insulated against all heat losses, and its interior is filled with a suitable substance, as broken rock of proper character and size, as illustrated in the drawings.

The collecting vessel is connected for free circulation with the still wherein the petroleum product to be treated is contained, in such a way that when the oil is heated and vaporized, the generated vapors are caused to pass through the labyrinth of small passages or interstices between the rough particles of broken rock, and to come into intimate contact with sufficient surface thereof at the proper velocity and temperature to allow the heavier hydrocarbons to separate from the true vapor at the existing temperature. The liquid product formed by the heavier hydrocarbons is returned to the still, or may be directed elsewhere, as desired.

The true vapor then continues on its way separate from the heavier portions, to the condenser where it is condensed, yielding an excellent product of considerably lesser specific gravity and lower boiling point than would be obtained without the vapors passing through the separator.

The drawings illustrate forms of apparatus in sectional elevation adapted to the carrying out of my improved process.

Fig. 2 shows a continuously operated apparatus wherein a number of units which consist of a separator in combination with its still and separate condenser, are so connected to each other that the liquid portions in the still transfer consecutively by gravity from one still to the other;

Fig. 3 shows a modified arrangement of a single still having a plurality of vapor outlets opening into individual separators.

Figure 1:
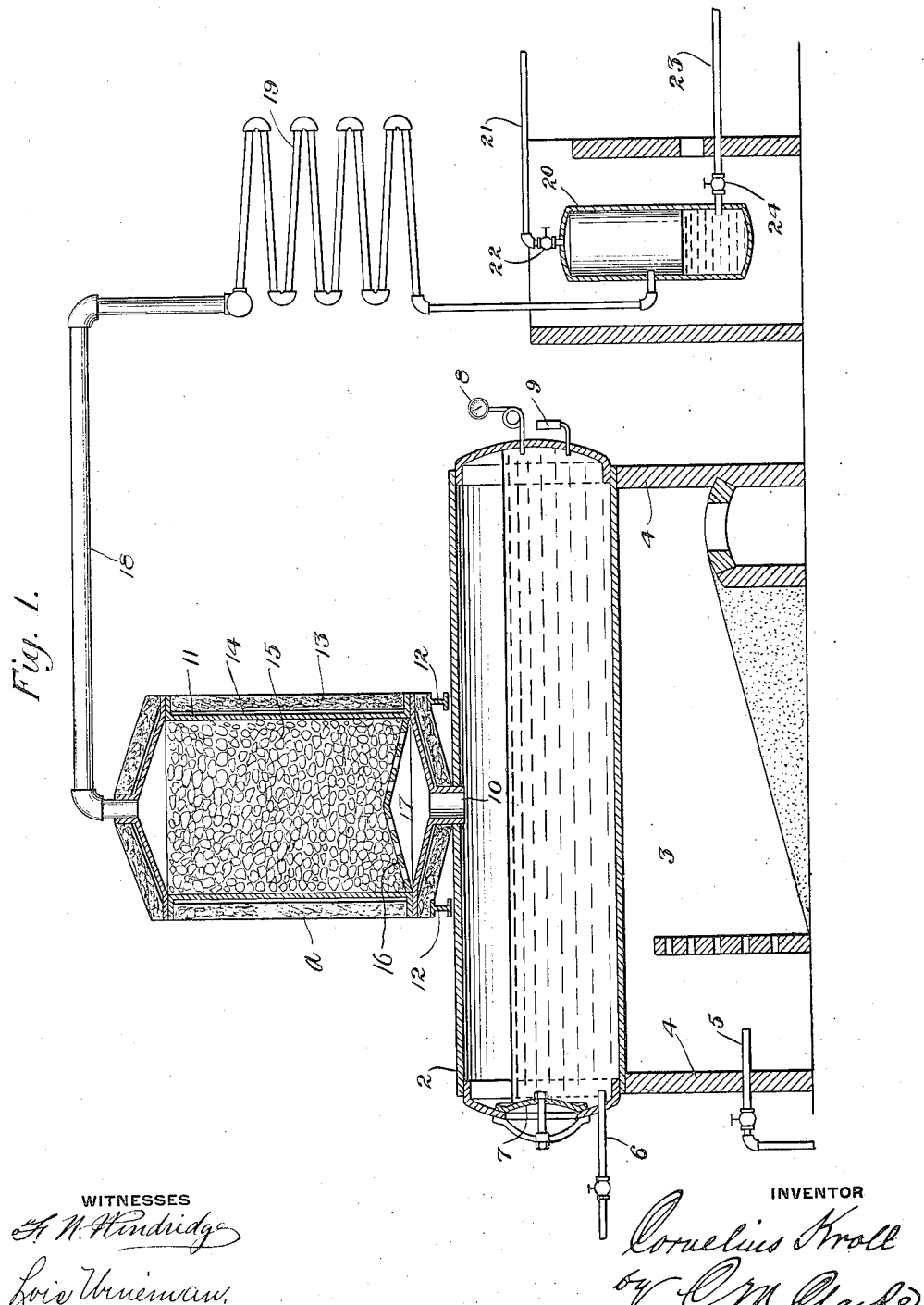
Figure 1 shows an intermittently operated apparatus.

Referring to Fig. 1, 2 is the still of any usual or standard construction mounted above the furnace chamber 3, by supporting walls 4, and provided with a fuel supply pipe 5, constructed for suitable fuel utilization and combustion, as indicated for the best results.

The still 2 is provided with a supply pipe 6, at any suitable point, a man-hole 7, pressure gage 8, and thermometer 9, if desired, the uses of which are well known, although the pressure gage is not necessary, except to show the absence of pressure.

The still may be preferably provided with a safety valve and pumping-out line (not shown), but which will be easily understood by those skilled in the art.

My improved separator $a$, which is mounted directly above the still, and in open communication therewith by a circulation port 10, of suitable cross sectional area, is so constructed as to provide for practically perfect insulation against heat losses. For such purpose, it comprises a shell or body portion 11, carried by suitable supports 12, extending across the top of the still, and is completely inclosed by a heat insulating covering 13, of asbestos or other suitable insulating material, spaced away from the shell 11, by the intervening air space 14, the insulation being suitably braced at intervals in any convenient way.

The interior of the separator $a$ is filled with a mass of rough crushed rock 15 of suitable size and character, supported above bottom baffle plate 16, adapted to maintain the burden with ample circulation space for the vapors, and located upwardly above a base vapor chamber 17. The object in thus thoroughly insulating the separator is to prevent, as far as possible, any loss of heat and consequent cooling of the vapor within the separator, allowing it to pass over therefrom to a point beyond where any resulting condensation will drain forwardly into the condenser and not back into the still.

Bearing in mind the difficulties ordinarily encountered in the present practised methods of distilling petroleum, and particularly the carrying over in mechanical suspension of higher boiling point hydrocarbons with the vapors of lower boiling point hydrocarbons, the advantages of the separator will be apparent. It effects a better and more complete separation of such interlinked vapors, so that the "end-point" of the condensate recovered is much closer to the temperature to which the vapors are heated than they would be without the separator.

The upper end of the separator is connected by a conduit 18, with a condensing coil 19, from which the oil is allowed to flow to a suitable storage tank 20.

In the apparatus of Fig. 1, the operation is as follows:

The still being charged with the necessary predetermined amount of petroleum product to be distilled, the contents of the still are heated by the furnace, all under the control of the operator. Distillation then begins and as it proceeds, and as the volume of oil in the still diminishes, additional oil may be pumped into the still until the residue therein accumulates to such an extent as to require removal.

The distilled vapors passing freely upwardly into the separator, separation between the lighter and heavier hydrocarbon portions is effected in the manner already described, the heavier portions being precipitated back into the still, and the lighter vaporous portions passing over through vapor conduit 18, before condensation.

Upon completion of the run, the fuel combustion is discontinued, the still is allowed to cool, and is pumped out, after which it is ready for another run. The operation hereinbefore described is an intermittent one, depending upon the quality of the product being treated, the capacity of the still, and various other limitations or conditions, as will be understood.

The complete insulation of the contents of the separator, and its ample cross sectional area, which may be practically co-extensive with the cross sectional area of the still itself, insures practically complete heat retention, resulting in separation of the utilizable portions of the product from those which are not adapted for utilization until further distillation, in the manner described.

In Fig. 2 I show an apparatus designed for continuous operation, of distillation and separation, and the other steps already described, but utilizing a series of connected stills, each having its individual separator $a$. Each still and its separator constitutes a separate operating unit for the oil fraction treated, each, however, producing a different product of different specific gravity, the specific gravities of the products becoming heavier as in the order of the number of stills. For example, if six units were connected in series, the first unit would top off the lightest fraction of the petroleum in the still. The next unit would take off the next fraction, and so on down the line to the sixth unit, which would produce the heaviest condensed fraction, the residue being pumped out of this still.

Oil is furnished to the first still 2, by supply pipe 6, and the stills of the series are connected by communicating transfer pipes 25 running from one still to the other, a discharge pipe 26, leading from the last still to a pump, for carrying off the residue.

Each separator *a* is provided with an individual conduit 18, connected with its individual condenser coil 19, each of which empties into its separate storage tank 20, thus producing separate products simultaneously. In the apparatus of Fig. 2, the operation subsequent to the separation of the vapors in separators *a*, is as already described, except, however, in producing a number of separate products simultaneously.

By providing a number of individual stills, as shown, connected in series, and each with its own furnace mounting and equipment and individual separator and individual condenser, the oil will be partially distilled in the first still, flowing by gravity to the next still and is further distilled therein, continuing through the series. Distilled vapors will pass upwardly through each separator, where the interlinked vapors will be separated, the lighter vapors composed of hydrocarbons of lower boiling point passing over and providing a recovered condensate of good " end-point " or low " end-point," in other words, " a finished product," and the heavier vapors composed of hydrocarbons of higher boiling point returning to the still for further distillation. As is well known, the lower the " end-point " for a certain specific gravity of product, the finer the product will be.

It is common practice to use a battery of stills in series, for continuous distillation, but to produce unfinished products, all of which are invariably re-distilled to form finished products. By the use of my system, each still having its individual separator and condenser, I am able to produce finished products on the first run.

In Fig. 3 I show a modified arrangement of apparatus in which a plurality of individual separators are connected to a single still and by vapor outlet connections to a single condenser, not shown.

Such plurality of separators provides a means for obtaining a sufficiently large cross sectional area of separating medium over what is possible with a single separator which might be unwieldy or impractical in mechanical construction because of its size. This present construction also permits of the use of a comparatively long still of relatively small diameter, presenting a greatly increased heating surface for the contained volume of oil with resulting heat efficiency.

Each of the several separators is of the same construction and method of operation as that already described, as to Fig. 1, the several parts being indicated by corresponding numerals primed. Each separator is provided with its individual outlet conduit 18' leading to a common header, not shown, communicating with one series of coils like coils 19, Fig. 1.

The operation is generally the same as in the apparatus of Fig. 1, and has additional advantages in that an increased total vapor area is provided for the outgoing vapors; there is a more even and freer distribution of the vapor outlets; the vapors are freely removed to the circulation as generated; the still has a correspondingly larger capacity, and can be operated at a faster rate, and it is proportionately more efficient and effects a better distillation of the oil.

Having described my invention, what I claim is:

1. The process of treating petroleum hydrocarbons consisting in distilling a liquid body thereof and passing the vapors of distillation into contact with and through a mass of percolable obstructing material, said mass being so heat-insulated from the surrounding atmosphere that the temperature of the vapors leaving said mass is substantially the same as the temperature of the vapors entering the said mass, abstracting from the said vapors the highest boiling hydrocarbons while passing through the said mass, and condensing the remaining vapors.

2. The process of treating petroleum hydrocarbons consisting in distilling a liquid body thereof and passing the vapors of distillation into contact with and through a mass of percolable obstructing material, said mass being so heat-insulated from the surrounding atmosphere that the temperature of the vapors leaving said mass is substantially the same as the temperature of the vapors entering the said mass, abstracting from the said vapors the higest boiling hydrocarbons while passing through the said mass, returning the substantially uncooled highest boiling point hydrocarbons in a liquid state from said mass to said liquid body, and condensing the remaining vapors.

3. The process of treating petroleum hydrocarbons consisting in distilling a liquid body thereof and passing the vapors of distillation into contact with and through a mass of percolable obstructing material, said mass being so heat-insulated from the surrounding atmosphere that the temperature of the vapors leaving said mass is substantially the same as the temperature of the vapors entering the said mass, abstracting from the said vapors the highest boiling hydrocarbons while passing through the said mass, returning the substantially uncooled highest boiling point hydrocarbons in a liquid state from said mass to said liquid body, and condensing the remaining vapors without returning any portion of the resultant condensate to said mass.

In testimony whereof I hereunto affix my signature.

CORNELIUS KROLL.